Patented Apr. 24, 1951

2,550,266

UNITED STATES PATENT OFFICE 2,550,266

PRESERVATION OF FOOD PRODUCTS

Lloyd B. Jensen, Chicago, Ill., and William A. Miller, Manhattan, Kans., assignors to Swift & Company, Chicago, Ill., a corporation of Illinois No Drawing. Application December 11, 1948, Serial No. 64,910

6 Claims. (Cl. 99—150)

The present invention relates to the preparation and use of an antibiotic substance, and more particularly to the preparation and use of an antimicrobial substance of plant origin.

The invention contemplates the utilization of an antibiotic substance naturally associated with tissues of the plant *Hypericum perforatum* (Lin.), commonly called St. John's wort.

Therefore, an object of the present invention is to provide a potent antibiotic substance of plant origin.

A further object of the invention is to provide an antibiotic substance which is non-toxic to humans.

An additional object of the invention is to provide an antibiotic substance which is resistant to heat.

Another object of the invention is to employ an antibiotic substance having an origin in a vegetative plant as a preservative for food products.

In achieving the objects of the present invention, finely cut or ground St. John's wort is treated with a suitable non-aqueous organic solvent such as acetone. The acetone layer containing the constituents of the plant tissue soluble therein is separated from the acetone-insoluble fibrous mass, the acetone removed therefrom, and the extract taken up in a carrier solvent, such as ethanol.

The following example illustrates a preferred embodiment of the invention, and the tests falling thereunder illustrate the potency of the material obtained in accordance with the processes of the example.

*Example.*—150 grams of the shrub St. John's wort were finely ground. The ground moss was then placed in a flask and covered with acetone. The flask was held at room temperature for approximately 24 hours and shaken at intervals. The acetone layer containing the acetone-soluble antimicrobial constituents of the St. John's wort was separated from the insoluble material by filtration, and the acetone was distilled off under a vacuum at 42° C. The residue was taken up in ethyl alcohol (95 per cent) so that 1 ml. of the alcoholic extract contained the acetone soluble material in 3 grams of the original St. John's wort.

In order to evaluate the effectiveness of the antibiotic material in the alcohol solution obtained in accordance with the example, the following test was performed:

Serial dilutions of the extract were made in 10 cc. broth tubes and the tubes inoculated with bacteria. Each 10 ml. broth tube contained approximately 75,000 cells of a food poisoning strain of *Staphylococcus aureus*, *Clostridium sporogenes*, and *Bacillus niger*. The tubes were allowed to incubate at a temperature of 37° C. and inspected for bacterial growth at the end of 1, 2, 3, and 6 days. In Table I are tabulated the results obtained with the aforesaid bacteria. The minus signs in said table indicate no bacterial growth, and the positive signs indicate the presence of viable bacteria at the incubation periods specified.

*Table I*

| Dilution in Difco Nutrient broth | Time held in days | Staphylococcus aureus | Salmonella typhimurium | Pseudomonas fluorescens | Bacillus niger | Cl. sporogenes | Controls |
|---|---|---|---|---|---|---|---|
| 1:100 | 1 | − | + | + | − | − | + |
|  | 2 | − |  |  | − | − |  |
|  | 3 | − |  |  | − | − |  |
|  | 6 | − |  |  | − | − |  |
| 1:500 | 1 | − |  |  | − | + |  |
|  | 2 | − |  |  | − | + |  |
|  | 3 | − |  |  | + |  |  |
|  | 6 | − |  |  | + |  |  |
| 1:1000 | 1 | − |  |  |  |  |  |
|  | 2 | − |  |  |  |  |  |
|  | 3 | − |  |  |  |  |  |
|  | 6 | − |  |  |  |  |  |
| 1:2000 | 1 | − |  |  |  |  |  |
|  | 2 | − |  |  |  |  |  |
|  | 3 | − |  |  |  |  |  |
|  | 6 | + |  |  |  |  |  |

St. John's wort antibiotic shows marked activity against certain gram positive bacteria although the data given in the above table indicate that the effects of the St. John's wort antibiotic vary in potency when tested against different organisms. Thus, the extract kills Staphylococcus in dilutions of 1 to 1,000, and *Bacillus niger* and *Clostridium sporogenes* in dilutions of 1 to 100. The bactericidal properties of the extract, lethally effective in the dilutions indicated for the various organisms, were demonstrated by inoculating nutrient agar plates with 0.1 cc. of the aforesaid dilutions which had been allowed to incubate for 5 days. After 5 days' incubation of the inoculated plates no viable bacteria were observed as a result of the transfers.

Although acetone is the preferred primary solvent, we have found that other organic solvents are suitable as the extracting solvent. For example, dioxane, ethyl acetate, methyl ethyl ketone and ethanol may be used. We have also found a water extraction of the antibiotic material to be ineffective as an antibiotic because of the proteinaceous material dissolved therein.

It is obvious that many variations in the solvent-treating process may be advantageously employed. The higher the temperature, generally the less time is required for extraction. Moreover, the extraction process may be carried out in one step; for example, with ethanol or with a mixture of solvents. We have found it preferable to process the antibiotic substance contained in the St. John's wort by a two-stage solvent process involving first treating the substance with a primary solvent which is substantially removed and then taking up the resulting extract with another solvent so as to form a solution which is a convenient form of using the product. We have found that acetone is a very effective primary solvent in producing the antibiotic substance from the plant tissue. After evaporating off the acetone, the preferred solution is made with a carrier solvent such as ethanol, which may be consumed internally without harm. By using ethyl alcohol we also utilize its well-known properties, such as non-toxicity and ability to prevent contamination.

In the processing of food products a serious problem is the preservation thereof, and although great strides have been made in improving the quality and keeping time of various food products by refrigeration, canning, curing, plant sanitation, etc., the problem of preservation of food requires the constant attention of the food processor to improve long-established methods of treating food and to devise new means of food control.

Food spoilage is due primarily to microbial action, and the species of microorganisms responsible for food deterioration are numerous. The sporing genera, Clostridium and Bacillus, for example, when contaminating food, cause food spoilage. Another serious concern of the food handler is food posioning, which is often of an insidious nature because food products may be contaminated with one or more of the harmful bacteria referred to herein and yet appear organoleptically sound. Among the food poisoning bacteria, the most common food poisoner is Staphylococcus.

The antibacterial substance of the present invention may be used to retard or prevent microbial growth in various food products, all of which tend to harbor pathogenic organisms in varying degrees. The antibiotic material disclosed herein, therefore, may advantageously be employed, for example, in treating meat products, such as hams, sausages, and canned meats; cream fillings for pastries, such as cream puffs, chocolate éclairs, custards, and the like; and canned vegetables, to prevent swelling due to organisms, such as the genus Bacillus.

The invention will be more fully understood from the following description of methods of using the antibiotic substance.

As hereinbefore mentioned, we have found that the antibiotic reagent herein described is lethal to a number of microbes in a 1 to 1,000 dilution of the extract, the extract being of such strength that 1 ml. of the alcoholic solution thereof contained the acetone-soluble constituents in 5 grams of root. Therefore, the addition of 1 part of the solution to 1,000 parts of the conventional pickling solution will result in a meat product cured therewith which has a very marked increase in resistance to the development of pathogenic organisms.

The following is an example of a curing pickle stock, which may be used in a process for quick-curing hams when provided with antibiotic substance in the proportions outlined above; that is, the antibiotic substance is added in an amount such as to effect a 1 to 1,000 dilution of the antibiotic material of the arbitrary strength herein described (1 ml.=5 g. of root).

To 100 gallons of a 90° Salometer solution there are added:

7 lbs. sodium nitrate
10 oz. sodium nitrite
20 lbs. sugar
378.5 cc. anibiotic solution Luncheon meat was cured according to conventional methods in which the antibiotic substance was present in a 1 to 1000 dilution. The meat product was placed in six 6-pound cans and retorted to an inside temperature of 155° F. and incubated at 99° F. After 30 days of incubation no swelling of the cans could be observed. The control cans swelled in one week.

A further example of the utility of the antibiotic material is their use in a cream filling for various pastries. To determine the effectiveness, a standard cream filling used in eclairs was inoculated with a bacterial solution containing 100,000 living *Staphylococcus aureus* S-1 per 100 ml. and the filling incubated at a temperature between 75° F. and 80° F. The results of the tests are given in Table II.

*Table II*

| Antibiotic | Dilution in cream filling | Incubated at 75°–80° F. Staphylococcus (S-1) per gram | | |
| --- | --- | --- | --- | --- |
| | | 24 hrs. | 48 hrs. | 72 hrs. |
| St. John's Wort | 1–100 | — | — | 16,000,000 |
| No antibiotic | 0 | — | — | 140,000,000 |
| No staphylococci | 0 | 0 | 0 | 0 |

The foregoing tests indicate that the antibiotic preparation exerts a pronounced inhibiting action against the *Staphylococcus aureus* in cream fillings.

Obviously, many modifications and variations of the invention as hereinbefore set forth may be made without departing from the spirit and scope thereof, and therefore only such limitations should be imposed as are indicated in the appended claims.

We claim:

1. In the process of treating food products, the step of adding to a food product a small amount of an alcoholic solution of antibiotic substance derived from the plant *Hypericum perforatum* to preserve said food product against pathogenic bacteria responsible for food poisoning and spoilage.

2. In the process of quick-curing meats, wherein a pickling solution is injected into said meat, the step of adding to said pickling solution a small amount of the antibiotic substance derived from the plant *Hypericum perforatum* by treatment with a non-aqueous organic solvent whereby the growth of pathogenic bacteria responsible for food spoilage and poisoning in the meat is substantially retarded.

3. In the process of preparing pastries containing fillings subject to spoilage by pathogenic bacteria, the step of adding to the said fillings a small amount of the antibiotic substance derived from the plant *Hypericum perforatum* by treatment with a non-aqueous organic solvent whereby the growth of pathogenic bacteria in the said fillings is substantially retarded.

4. A meat pickle including a small amount of an antibiotic substance derived from the plant *Hypericum perforatum* by treatment with a non-aqueous organic solvent.

5. A cream filling for pastries including a small amount of an antibiotic substance derived from the plant *Hypericum perforatum* by treatment with a non-aqueous organic solvent.

6. In the process of treating food products, the step of adding to a food product a small amount of an antibiotic substance derived from the plant *Hypericum perforatum* by treatment with a non-aqueous organic solvent to preserve said food product against pathogenic bacteria responsible for food poisoning and spoilage.

LLOYD B. JENSEN.
WILLIAM A. MILLER.

REFERENCES CITED

The following references are of record in the file of this patent:

UNITED STATES PATENTS

| Number | Name | Date |
|---|---|---|
| 469,850 | Chesebrough | Mar. 1, 1892 |
| 2,084,864 | Paddock | June 22, 1937 |
| 2,098,110 | Schertz et al. | Nov. 2, 1937 |
| 2,117,478 | Hall | May 17, 1938 |
| 2,180,750 | Urbain | Nov. 21, 1939 |

OTHER REFERENCES

"Nature," May 13, 1944, vol. 153, page 598, article entitled "Antibacterial Substances in Green Plants."

"Chemical and Engineering News," September 1945, page 1622, article entitled "Penicillin as a Preservative."

"The American Woman's Cook Book," 1945, by Ruth Berolzheimer, published by Consolidated Book Publishers, Chicago, page 475.